Dec. 12, 1939.  N. M. THOMAS  2,182,829
METHOD OF MAKING A FRUIT CONCENTRATE
Filed Feb. 19, 1937
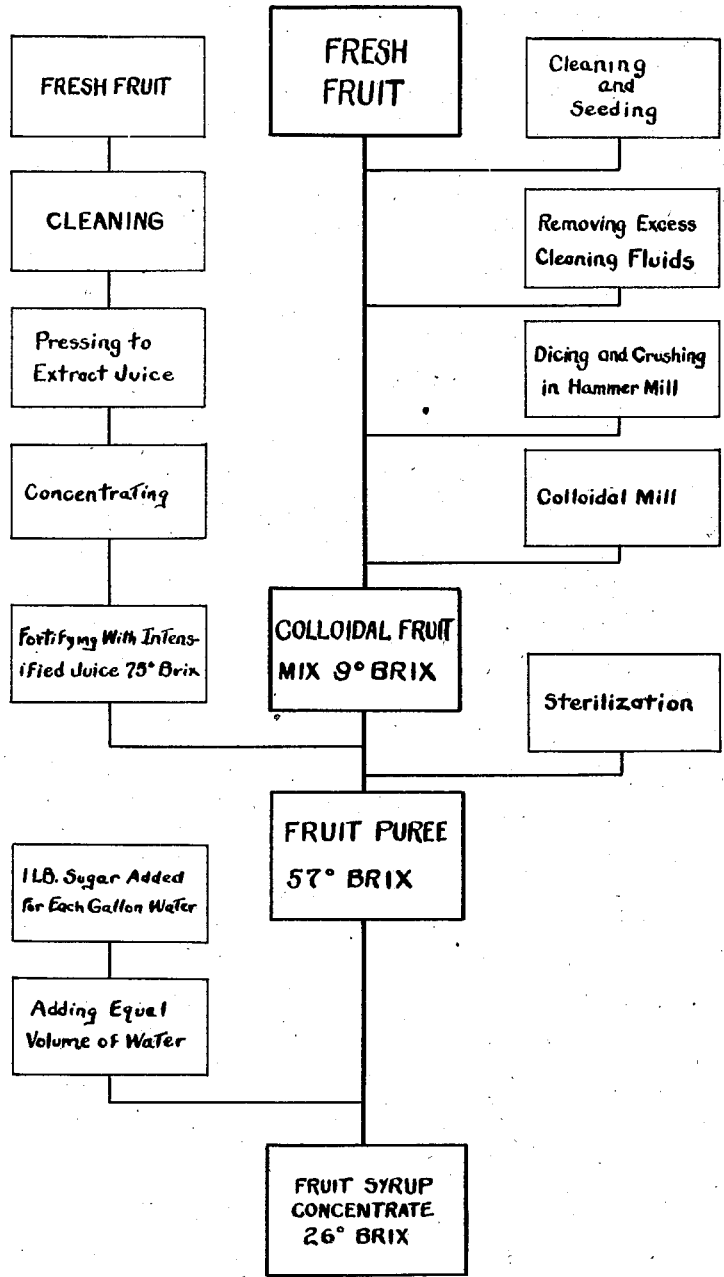
INVENTOR.
Norman M. Thomas
BY
ATTORNEY.

Patented Dec. 12, 1939

2,182,829

UNITED STATES PATENT OFFICE 2,182,829

METHOD OF MAKING A FRUIT CONCENTRATE

Norman M. Thomas, Brooklyn, N. Y., assignor to Joe Lowe Corporation, New York, N. Y., a corporation of Delaware Application February 19, 1937, Serial No. 126,557

5 Claims. (Cl. 99—205)

The present invention relates to the manufacture of concentrated fruit flavors, and it has particular relation to a method of treating natural fruits to produce a pure fruit concentrate or puree that is especially adapted and fitted for making and flavoring substances manufactured, sold and/or used at freezing temperatures.

Heretofore, the outstanding difficulty in the preparation of true fruit concentrates suitable for use in flavoring potable or edible substances, and particularly those intended to be consumed at freezing temperatures, was the inability to produce a natural fruit flavor and taste in the finished product. This unfavorable result was due primarily to bringing about a chemical change in some form or other in the fruit product by cooking or otherwise treating the natural fruit to preserve the same. In all such concentrated fruit products, the fruit pulp, if any was contained therein, was simply a crushed fruit which rapidly separated out and was practically impossible of being maintained in suspension for any given period of time.

A further difficulty arises when such fruit concentrates are used at temperatures below freezing, and the resultant product is intended to be consumed at such freezing temperatures. In such cases the extreme coldness of the product partially paralyzes the nerve centers of the taste organs of the mouth, and the result is that the natural flavor of the fruit is insufficient, in itself, to produce the original flavor and taste under such freezing conditions, thereby giving the product the effect of poor flavor and taste. However, in an effort to overcome this disadvantage, it has been a customary practice to strengthen the fruit flavor and taste in various ways. One principal method previously used consisted of adding large pieces of original fruit, together with additional synthetic flavoring, oils and/or extracts, to an extent sufficient to reproduce the flavor and taste of the fresh fruit at low freezing temperatures. Another method of accomplishing the same result was by the direct admixture of excessive quantities of the fresh fruit directly in the frozen edible product during its manufacture. Both of these methods have many disadvantages over the present invention, which obviates the use of synthetic flavors, expensive essential oils, and excessive quantities of fresh fruits which at best were only obtainable during their respective harvesting periods. An inherent difficulty of the flavoring extracts of the prior methods was the need of the addition of a chemical preservative, such as benzoate of soda, to prevent bacteria, fungi and other micro-organic growths therein.

An object of the present invention is to provide a simple and inexpensive method of preparing and shipping a fruit puree, containing no added preservatives, which may be diluted with substantial quantities of water to produce a fruit syrup concentrate which will have, at normal freezing temperatures, the flavor, taste and pulp content of the natural fruit at ordinary temperatures.

Another object of the invention is the provision of a fruit puree which may be stored over long periods of time at normal room temperatures without deterioration.

A further object of the invention is to provide a fruit syrup concentrate which will remain plastic at normal refrigerating temperatures to produce a new and novel frozen fruit product.

Another object of the invention is the provision of a fruit syrup concentrate containing fruit pulp which will remain in colloidal suspension, thereby maintaining a uniform distribution of the fruit pulp in the solution over long periods of time, both at ordinary and at normal freezing temperatures.

A further object of the invention is the preparation of a pure fruit puree, containing fruit pulp in colloidal suspension in its own juice to which may be added a diluent, such as additional sugar and water solution, to produce a resultant fruit syrup concentrate having the same colloidal characteristics.

Another object of the invention is the provision of a fruit puree of a single specie of a genus, intensified with the concentrated juice of another specie of the same genus, thereby providing a new, novel and tasteful fruit product.

Other and further objects and advantages of the invention will be apparent from the following description, wherein a preferred method is described in detail, reference being had also to the accompanying drawing, forming a part thereof, in which the several steps of the process are graphically illustrated for convenience in understanding.

In practicing the invention fresh fruit, such as strawberry, raspberry, loganberry, pineapple, orange, lemon, peach, cherry, grape, lime, and the like, are first taken and thoroughly cleaned and seeded. In the cleaning and seeding of the fresh fruit, it is, of course, necessary to remove the stems, rind, peel, seeds and core, if any, as well as the dust, dirt and/or other foreign matter contained thereon. These various parts may be removed by any suitable or conventional manner, which does not comprise a part of this invention. However, inasmuch as the invention does contemplate the use of the natural sugars present in the fruit, it is advisable that they be picked and used at the moment of full maturity when such sugars have reached their optimum percentage. Furthermore, after the cleaning and seeding operation, any excessive water used therein should be allowed to drain from the fruit in order that such fruit shall be free of any unnecessary diluent, since one of the objects of the invention being to produce a concentrated fruit product.

After the cleaning and seeding operations have been performed on the fresh fruit, it may be necessary to cut and/or crush the same preliminarily in order to render it suitable for feeding to a colloidal mill or other similar apparatus. One form of treatment which I have found adaptable for this purpose is preliminary crushing in a high-speed hammer-mill made of corrosive proof material with a large screen opening. The resultant crushed semi-fluid mixture is then pumped or otherwise delivered to the colloidal mill.

Treatment in the colloidal mill reduces the particle size of all of the solid matter of the fruit, such as the pulp, to colloidal dimensions, and then distributes such insoluble matter in colloidal suspension in its own fruit juice mix. The resultant mix, as it is withdrawn from the colloidal mill, is a syrupy liquid substance containing the fruit solid, including the pulp, in colloidal suspension, and also containing in the solution all of the natural fruit sugars, flavoring and coloring matters of the original fruit.

When the mix is withdrawn from the colloidal mill, its specific gravity, as measured and expressed in the sugar industry in degrees Brix, varies greatly depending upon the kind and type of fruit used originally. It will also be obvious that the specific gravity of syrups of fruits of the same genus and of the same species will vary depending somewhat on the place where they were grown, the type of weather in which they were grown, the time of harvesting, soil conditions, etc. Therefore, in view of such a wide variation of specific gravities of the mix as it is withdrawn from the colloidal mill, it is impossible to briefly and specifically treat of each specie and/or genus of each fruit in detail in this specification in describing the remaining steps of the invention. However, it is believed that a detailed explanation of these steps with respect to a single fruit, as an example, will be sufficient for anyone skilled in the art to carry on the method and process of treating other fruits similarly.

Therefore, for the purpose of illustrating the important features of the invention during the balance of the steps of my novel process, I have selected the pineapple as the best illustrative fruit, since it is one of the most commonly used fruits for flavoring purposes. It is believed that the description of the process with respect to pineapple will be sufficient to enable anyone to treat the other fruits in a corresponding manner, except for the amounts of sugar and intensified juice to be added, and that these quantities can readily be determined for each particular type or variety of fruit by actual operating tests for flavor and taste without departing from the spirit and scope of the invention. For the purpose of illustrating the remaining steps of the process, let us now assume that the pineapple mix is in the form in which it is withdrawn from the colloidal mill. It will be found to have, upon testing, a reading of the nine degrees Brix.

The next step in the process is the fortification of this mix, having a reading of nine degrees Brix, by the addition of intensified fruit juice obtained from mechanically expressed juice from the same natural fruit. The best and preferred form of intensified fruit juice is produced by reducing the juice of the natural fruit in volume in the ratio of eight to one without employing the direct application of heat. This evaporation step in the process may be carried out in any conventional manner, such as for example, by bringing heated air or other gases into contact with the juice, or by bringing a dehydrated air or other gases into contact with such juice. The direct application of heat to the fruit juice is undesirable as this mode of treatment produces chemical changes in the fruit juice which adversely affects taste and flavor. Obviously, during the concentration of the juice the percentage of the natural sugars present in the original juice will increase proportionally to the decrease in volume, and the acidity thereof and/or the presence of the natural sugars, dextrose or levulose, will invert more of the sugars so that the finally reduced intensified fruit juice consists of a thick viscous syrupy substance containing the fruit color, esters and other soluble organic components in a mixture of sucrose and invert sugar, the latter being a mixture of dextrose and levulose. This fruit juice, by not being subjected to the direct application of heat during the concentration thereof, will have a flavor, taste, aroma, and color equal to the ratio of concentration, or, in the example given, of eight times its equivalent weight per equal volume of fruit juice. Normally the final intensified juice will have a specific gravity of approximately seventy-five degrees Brix. Of course, it will be understood that this figure is merely illustrative of the finished intensified juice after concentration. However, with the common fruits aforementioned, the concentration is normally between a six-to-one and an eight-to-one ratio.

The original pineapple mix of the colloidal mill, having a specific gravity of nine degrees Brix, is now ready for fortification by the addition of the intensified pineapple juice prepared as described in the preceding paragraph. Therefore, a sufficient amount of intensified juice should be added to the pineapple mix of nine degrees Brix to produce a resultant fruit puree having a reading of from fifty-four to fifty-eight degrees Brix, depending somewhat on the final taste desired. With an intensified fruit juice of seventy-five degrees Brix, it will take two gallons of the intensified flavor to be added to one gallon of the nine degrees Brix fruit mix to produce a fortified fruit puree of fifty-seven degrees Brix.

The fruit puree, having a reading of from fifty-four to fifty-eight degrees Brix, is then sterilized with heat in any suitable manner to destroy any yeasts, molds, fungi or other micro-organisms present. This sterilization step in the process also hastens the further inversion of the sucrose present into invert sugar, or dextrose and levulose. It is preferable that the relation between the sucrose and the invert sugar present in this final puree be in the ratio of sixty percent sucrose and forty percent invert sugar. While this percentage of invert sugar is indicated as desirable, any percentage of invert sugar above forty percent will give the finished concentrate or puree the desirable properties at both ordinary and freezing temperatures.

By following the process described above, it is also possible to produce a desirable true fruit concentrate by combining the colloidal mix of a single fruit with the fortified or intensified juice of another fruit of the same genus. For example, to produce a novel and appetizing combined fruit puree of lemon and lime flavors, a colloidal mix secured from fresh lemons may be fortified with intensified juice of limes. Obviously, other combinations can also be worked out without departing from the spirit and scope of this invention.

It will be found upon examination and test that the finished fruit puree contains all of the ingredients of the original fruit, fortified in taste, color and aroma by the intensified fruit juice embodied in a syrup of high viscosity and of a self preservative nature. It is thus capable of being stored in a room at normal temperatures over long periods of time without deterioration, and the insoluble matter, such as the pulp contained therein, will be found uniformly distributed and in colloidal suspension throughout the finished fruit puree. This puree is self-preservative because of its high sugar content, which although not always added directly, is nevertheless present and exerting its protective influence against deterioration due to the high concentrations of the sugars in their own natural fruit juices.

Another novel characteristic of the fruit puree is the fact that it can be readily diluted by the addition of water in the ratio of one to one without losing any of its aforementioned properties and characteristics. Furthermore, additional sugar may be added, preferably in the ratio of one pound to one gallon of puree, without destroying any of said properties and characteristics of the concentrate. In this diluted form the substance may be deposited in any suitable form of mold and subjected to normal freezing temperatures, whereupon a resultant product will be obtained which is plastic and edible at such normal freezing temperatures at which such products are generally consumed. The frozen plastic product has a flavor and taste of the original fruit in spite of the paralyzing effect of such low temperatures on the taste organs of the mouth. The product is readily edible when frozen, and is crunchable or spoonable like ice cream or other similar products. However, the product is able to retain a definite shape or form, and the ice crystals formed during the refrigerating period, or periods, remain impalpably fine, thereby rendering a smooth, tasty product heretofore unknown in the ice cream industry. This inherent property is believed due to the ratio of the sucrose to the dextrose and levulose and the high concentration of sugars present therein.

When ordinary temperatures are referred to herein, it is meant those temperatures prevailing during the summer months of the year or indoors during the winter months, such as for example between 60 degrees F. and 90 degrees F.; and when normal freezing temperatures are referred to herein, it is meant those temperatures generally used in the manufacture of frozen confections as well as those temperatures at which they are served, namely, between plus 15 degrees F. and minus 15 degrees F.

Due to the high viscosity and the physical state of the fruit syrup concentrate, the unfrozen liquid material in the frozen substance will not have a tendency to "bleed" or separate out within the temperature ranges given above for manufacturing and serving the same.

By "inversion" is meant the hydrolysis of cane or beet sugar, chemically known as sucrose ($C_{12}H_{22}O_{11}$). Sucrose is one of the members of a group of chemical substances known as polysaccharides. By inversion or hydrolysis this polysaccharide is converted to two mono-saccharides, dextrose and levulose ($C_6H_{12}O_6$) according to the following formula:

$(C_{12}H_{22}O_{11})$ plus $(H_2O) \rightarrow (C_6H_{12}O_6)$ plus $(C_6H_{12}O_6)$
Cane sugar    Water    Dextrose    Levulose This chemical change, as above described, can be brought about by a number of methods: The presence of acid, heating the sugar solution, enzymatic substances like invertase, and other inverting substances all aid in effecting this change and in producing the same result.

Although I have only described in detail one embodiment of the invention, it will be apparent to those skilled in the art that the invention is not so limited, but that various other modifications may be made therein without departing from the spirit thereof or from the scope of the appended claims.

What I claim is:

1. The method of making a fruit puree which comprises washing and seeding a fresh fruit, reducing the seeded fruit pulp to a colloidal state and distributing the same in colloidal suspension in its own juice to form a syrupy fruit mix, fortifying the resultant mix with an intensified juice of the same fruit which has been concentrated without the direct application of heat, and then heat treating the concentrate to invert at least forty percent of the sucrose and to effect sterilization.

2. The method of making a fruit puree which comprises washing and seeding a fresh fruit, reducing the seeded fruit pulp to colloidal dimensions and distributing the same in colloidal suspension in its own juice to form a syrupy fruit mix, adding a fruit juice containing a polysaccharide which is capable of hydrolysis, hydrolyzing until approximately forty percent of the polysaccharide has been reduced to monosaccharides wherein the resultant product is a liquid at normal temperatures and becomes a form retaining plastic at normal freezing temperatures.

3. The method of making a fruit syrup concentrate which comprises washing and seeding a fresh fruit, reducing the fruit pulp to colloidal dimensions and distributing the same in colloidal suspension in its own juice to form a syrupy fruit mix, fortifying the mix with an intensified juice of the same fruit containing a polysaccharide, hydrolyzing the resultant admixture until at least forty percent of the polysaccharide has been reduced to monosaccharides, and then diluting the admixture with water to produce a concentrate which is a syrupy liquid at normal temperatures having the flavor, taste and pulp of the original fruit and which will produce impalpably fine crystals and remain substantially a form retaining plastic at normal freezing temperatures.

4. The method of making a fruit syrup concentrate which comprises washing and seeding a fresh fruit, reducing the seeded fruit pulp to a colloidal state and distributing the same in colloidal suspension in its own juice to form a syrupy fruit mix, fortifying the mix with intensified juice of the same fruit containing sucrose, treating the fortified mix with heat to obtain a substantial inversion of the sucrose, and then diluting the mixture with water to produce a resultant product having the flavor, taste and pulp of the original fruit which is liquid at normal temperatures and which will produce impalpably fine crystals and remain a form retaining plastic at normal freezing temperatures.

5. The method of making a pure fruit syrup concentrate which comprises washing and removing the seeds from the fresh fruit, crushing the fruit to reduce its particle size and further reducing the particle size to colloidal dimensions and distributing the same in colloidal suspension in its own juice to form a syrupy fruit mix, fortifying the mix with intensified fruit juices containing sucrose, heat treating the mixture to obtain a final product having at least forty percent of the sucrose inverted, the amount of added intensified fruit juice being such that when diluted with equal volumes of water containing one pound of sugar per gallon of diluent the resultant product is a liquid at normal temperatures and becomes a form retaining plastic at normal freezing temperatures, having the flavor, color and taste of the original fruit.

NORMAN M. THOMAS.